W. L. HEINIG & M. A. JOHNSTON.
VULCANIZING CORE.
APPLICATION FILED OCT. 12, 1914.
1,167,172.
Patented Jan. 4, 1916.
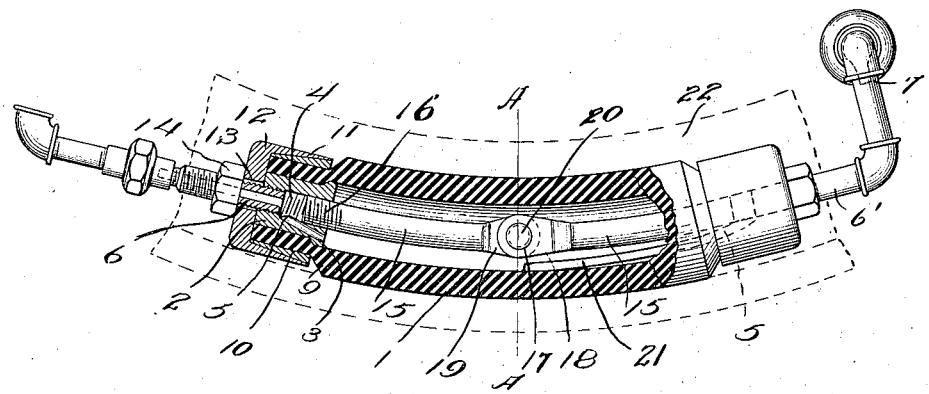
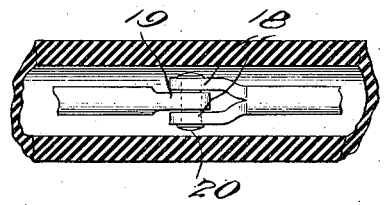
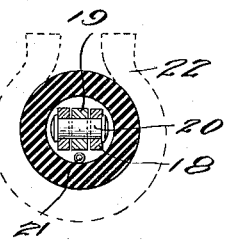

UNITED STATES PATENT OFFICE.

WILLIAM L. HEINIG AND MARION A. JOHNSTON, OF DENVER, COLORADO.

VULCANIZING-CORE.

1,167,172.   Specification of Letters Patent.   Patented Jan. 4, 1916.

Application filed October 12, 1914. Serial No. 866,406.

*To all whom it may concern:*

Be it known that we, WILLIAM L. HEINIG and MARION A. JOHNSTON, citizens of the United States, residing at Denver, in the county of Denver and State of Colorado, have invented certain new and useful Improvements in Vulcanizing-Cores; and we do hereby declare the following to be a full, clear, and exact description of the invention, such as will enable others skilled in the art to which it appertains to make and use the same.

This invention is a core for vulcanizing tubular rubber members such as an automobile tire or shoe, and the objects of the invention are to prevent the longitudinal stretching of such a core while permitting it to flex and to expand laterally, to provide means whereby the core may be bent to adapt it to tires of different size, and to provide for the inlet of the heating fluid such as steam and the outlet of the water of condensation. These objects are accomplished by constructing the core and associated parts in a manner hereinafter described and claimed, and as shown in the drawings wherein—

Figure I is a longitudinal sectional view of this device, partly in side elevation, Fig. II is a fragmentary horizontal section, and Fig. III is a cross section on the line A—A of Fig. I.

This core has a body 1 which is by preference composed of a piece of ordinary commercial steam hose of proper size and length, and at its ends are closures which are steam fittings when steam is the heating fluid. That is to say, into each end of the body is inserted a tubular plug 2 enlarged or flanged as at 3 around its inner extremity and having a threaded bore 4 and a passage 5 connecting a point at about the midlength of said bore with the inner end of the plug. A pipe 6 is screwed in the outer end of the bore of one plug and serves to connect the interior of the core with any suitable source of fluid supply such as steam, the pipe 6' at the opposite end of the core permitting the escape of the fluid or steam and preferably having a drip cock as indicated at 7. Each end of the body 1 of the hose where it surrounds the plug is preferably reduced as at 9 and inclosed within a split and tapered collar 10, the latter in turn being inclosed by the tapered skirt 11 of a cap 12. The cap is pierced with a hole 13 through which the pipe 6 passes loosely, and a nut 14 is screwed on the pipe to hold the parts in place. By setting up this nut the cap is forced onto the collar so as to compress the latter and clamp the end of the hose around the plug—thereby preventing leaks. These or like fittings engage the extremities of the hose, and between them the body may be expanded radially to fill the interior of the tire, but it is desired that it shall not expand longitudinally. Hence we connect the plugs by a flexible but inexpansible element. This might be of any suitable character, but by preference it is composed of a rod made in parts which are loosely connected. In the drawings is shown a rod in two parts 15, threaded at their outer ends as at 16 and screwed into the inner ends of the bores 4 of the plugs; while the inner end of one part 15 is reduced and flattened as at 19, that of the other part is forked as at 18, its arms passed astride the reduced end and perforated as at 17, and the parts are then connected by a pivot pin 20. This pivot or joint within the two-part rod stands at about the midlength of the body 1 and extends horizontally across it as shown in Figs. I and II, so that if the tire being cured or vulcanized is small the core can be given a greater curvature than illustrated.

While we do not wish to be confined to the use of steam as the heating fluid, when the same is employed provision is made for the outlet of the water of condensation from the lowest point in the tubular core. This is preferably accomplished by means of a water pipe 21 which is of a material sufficiently flexible to adapt itself to the different curvatures required in the body and also to permit it to lie within the bottom of the tubular core as shown in Fig. I. Its intake end stands beneath or substantially beneath the joint in the two-part rod 15, and its outer end is connected with one of said passages 5 as shown in dotted lines. When the core is placed within the tire being cured or vulcanized, as indicated in dotted lines in Fig. I, this pipe 21 has its intake end at the lowest point within the core, and the water of condensation will either run out or be forced out of the same by the pressure of steam admitted. The process of vulcanizing rubber is well understood, and therefore the use of this device is obvious.

What is claimed as new is:

1. A core for vulcanizing purposes comprising a flexible tubular member, closures at the ends of the same, means for admitting a fluid heating agent, an internal element connecting said closures and adapted to hold the member against longitudinal stretching, and means for permitting said element to flex, for the purpose set forth.

2. A core for vulcanizing purposes comprising a flexible tubular member, closures at the ends of the same, means for admitting a fluid heating agent, an element connecting said closures and adapted to hold the member against longitudinal stretching, and jointed means for permitting said element to flex, for the purpose set forth.

3. A core for vulcanizing purposes comprising a flexible tubular member, plugs closing the ends thereof and having openings for the circulation of steam throughout said member, a two-part rod within said member with the outer ends of its parts connected with said plugs, and a joint between the inner ends of said parts.

4. A core for vulcanizing purposes comprising an expansible tubular member, steam tight closures at the ends thereof, an element connected with the ends of said member for holding the same against longitudinal stretching, means for admitting steam into said member, and a water outlet therefrom having its intake at the lowest part of the interior of the core.

5. A core for vulcanizing purposes comprising a flexible tubular member, plugs located in the ends of and forming steam-tight closures for such member, a bracing element interposed between the plugs and connected thereto, means for admitting steam through one of said plugs, and a water outlet pipe passing through the other plug and having the intake end thereof at the lowest part of the interior of the core.

6. A core for vulcanizing purposes comprising a radially expansible tubular member, steam-tight closures at the ends of said member, means connecting said closures and preventing the longitudinal stretching of said member, means for admitting steam to said member, and a flexible water outlet pipe having its intake end at the lowest point within said member.

7. A core for vulcanizing purposes comprising a flexible tubular member, plugs closing its ends and provided with fluid inlet and outlet openings respectively, a two-part rod within said member with the outer ends of its parts connected with said plugs, a joint between the inner ends of said parts, and a flexible outlet pipe with its intake end beneath said joint and its other end communicating with said outlet opening.

8. A core for vulcanizing purposes comprising a flexible tubular member, plugs in its ends and having fluid inlet and outlet openings and passages connecting their mid-length with the inner ends of the plugs, a two-part rod within said member with the outer ends of its parts screwed into the inner ends of said openings, a joint between the inner ends of said parts, and a flexible outlet pipe leading to one of said passages and with its intake end beneath said joint.

9. In a core for vulcanizing purposes, a flexible tubular member, plugs located in the ends of the tubular member, flanges on the inner ends of said plugs, clamping means surrounding the ends of the flexible member and adapted to grip them against the plugs, means for admitting steam to the member, and a jointed bracing rod interposed between the plugs.

10. A core for vulcanizing purposes comprising a flexible tubular member, plugs located in the ends thereof, said plugs adapted to form a steam-tight connection with the tubular member, a flexible bracing element interposed between the plugs and connected thereto, means providing a steam inlet associated with one of said plugs, means providing a steam outlet associated with the other of said plugs, and a water pipe connected with the latter-named plug and having the end thereof at the lowest part of the interior of the core.

11. A core for vulcanizing purposes comprising a flexible tubular member, plugs located within the ends thereof, flanges formed on the inner ends of the plugs, tapered collars surrounding the ends of the tubular member, caps having skirts surrounding the tapered collars, externally threaded pipes connected to the outer ends of the plugs, screw-threaded means engaging the pipes and adapted to urge the caps along the collars to clamp the ends of the flexible tubular member upon the plugs, and means for admitting steam to and water from said member.

12. A core for vulcanizing purposes comprising a flexible tubular member, plugs located within the ends thereof, flanges formed on the inner ends of the plugs, tapered collars surrounding the ends of the tubular member, caps having skirts surrounding the tapered collars, externally threaded pipes connected to the outer ends of the plugs, screw-threaded means engaging the pipes and adapted to urge the caps along the collars to clamp the ends of the flexible tubular member upon the plugs, means for admitting steam to and water from the member through said pipe, and a jointed element within the member having its ends connecting said plugs, for the purpose set forth.

In testimony whereof we affix our signatures in presence of two witnesses.

WILLIAM L. HEINIG.
MARION A. JOHNSTON.

Witnesses:
CARLE WHITEHEAD,
ALBERT L. VOGL.